United States Patent [19]

Scrine et al.

[11] 4,240,266
[45] Dec. 23, 1980

[54] APPORTIONING MEANS FOR REFRIGERATION SYSTEM

[75] Inventors: Gerald R. Scrine, Cambridge; William D. M. Carter, Huntingdon, both of England

[73] Assignee: Shipowners Refrigerated Cargo Research Association, London, England

[21] Appl. No.: 899,077

[22] Filed: Apr. 24, 1978

[30] Foreign Application Priority Data

Apr. 29, 1977 [GB] United Kingdom ............... 18017/77

[51] Int. Cl.$^3$ ............................................. F25B 41/00
[52] U.S. Cl. .................................... 62/196 B; 251/75; 251/282
[58] Field of Search ................ 62/196 B, 117; 236/75; 251/282, 339; 187/625.5

[56] References Cited

U.S. PATENT DOCUMENTS

| 2,269,127 | 1/1942 | Riley | 251/339 X |
| 2,980,139 | 4/1961 | Lynn | 251/282 X |
| 3,914,952 | 10/1975 | Barbier | 236/75 X |
| 3,933,004 | 1/1976 | Carter et al. | 62/196 B |

*Primary Examiner*—William E. Wayner

[57] ABSTRACT

In a refrigeration system for a substantially enclosed space and including a compressor, a condenser, an evaporator, conduit means connecting the said compressor, condenser and evaporator to form a cooling circuit, a hot gas by-pass conduit between the compressor and the evaporator, and means provided in the system for apportioning flow of gas between the cooling circuit and the by-pass conduit so that, during a temperature controlling phase of refrigeration, the gas flows both to the condenser and to the by-pass conduit and the apportioning of flow can cause either net heating or net cooling of the enclosed space, the improvement which comprises said apportioning means being in the form of a continuously modulating valve located at the junction of the hot gas by-pass conduit with the cooling circuit between the compressor and the condenser, said valve having a hot gas intake port for receiving hot gas from the compressor, a first outlet port connected to the hot gas by-pass conduit, a second outlet port connected to the cooling circuit upstream of the condenser, valve closure means, and valve control means for continuously modulating said valve closure means between a first position for closing off the first outlet port and a second position for closing off the second outlet port whereby the hot gas may be continuously variably apportioned between said hot gas by-pass conduit and the condenser.

9 Claims, 4 Drawing Figures

APPORTIONING MEANS FOR REFRIGERATION SYSTEM

BACKGROUND OF THE INVENTION

The present invention relates to refrigeration systems.

There has previously been disclosed in U.S. Pat. No. 3,933,004 a refrigeration system for a chamber including a compressor, a condenser and an evaporator, forming a cooling circuit, and having a hot gas by-pass conduit from the compressor to the evaporator, in which is provided means for apportioning the flow of compressed refrigerant gas from the compressor between the condenser and the by-pass conduit to provide, during a temperature controlling phase of refrigeration, gas flows through both the condenser and the by-pass conduit, the apportioning means being arranged to control the relative proportions of the gas flows through the condenser and the by-pass conduit to provide either net heating or net cooling of the chamber.

SUMMARY OF THE INVENTION

It is an object of the invention to provide such a system with improved apportioning means. It is a further object of the invention to provide an improved continuously modulating valve suitable for use in such a system.

It has now been found that satisfactory temperature control and gas flow apportionment to the condenser and by-pass conduit can be obtained by use of apportioning means in the form of a continuously modulating valve located at the junction of the hot gas by-pass conduit with the cooling circuit between the compressor and the condenser, said valve having a hot gas intake port for receiving hot gas from the compressor, a first outlet port connected to the hot gas by-pass conduit, a second outlet port connected to the cooling circuit upstream of the condenser, and valve control means for continuously modulating valve closure means between a first position for closing off the first outlet port and a second position for closing off the second outlet port whereby the hot gas may be continuously variably apportioned between said hot gas by-pass conduit and the condenser.

Since the hot gas by-pass will normally be at low pressure while both the inlet and the second outlet will be at high pressure, the valve is desirably of the balanced pressure type, i.e. means are provided for balancing the forces exerted on the valve closure means due to the pressure differential between either side thereof. Thus, for example, a gas leak passage is provided through the valve closure means from the inlet and/or second outlet i.e. high pressure side to pressure operated biasing means on the first outlet i.e. low pressure side of the valve closure means, arranged to bias said valve closure means so as to compensate for the force exerted on the valve closure means by the pressure differential between said high and low pressure sides thereof.

Suitable biasing means may comprise axially expansible bellows having one end fixed and the other end attached to the movable valve closure means.

In a particularly preferred valve, the biasing means comprises a chamber in the form of a piston cylinder through which a piston rod of the valve closure means is disposed, a biasing piston fixed about said piston rod with a sliding fit in said piston cylinder substantially separating said chamber from the low pressure side of the valve closure means so that in use of the valve high pressure gas enters the chamber through the gas leak passage and exerts a force on the biasing piston counteracting the force exerted on the valve closure means due to the pressure differential between the high and low pressure sides thereof.

Preferably, the biasing piston is provided with a piston ring of PTFE, e.g. Teflon (Trade Mark) or similar low friction material to minimize any frictional forces between the biasing piston and piston cylinder walls.

In another preferred valve the biasing piston is a labyrinth piston which allows a small restricted leakage of high pressure gas from the chamber by expansion through each "ring and trough" of the labyrinth biasing piston to the low pressure side of the valve closure means.

Both the last two mentioned valves have the advantage over the bellows type that the counteracting force applied to the valve closure means is maximized and acts as evenly as possible, while avoiding frictional forces that may occur between the outer edges of the bellows and the chamber walls as well as possible failure of the valve due to rupture of the bellows.

In a further aspect the present invention provides a continuously modulating valve having an intake port for gas at high pressure, a first outlet port for gas at low pressure, and a second outlet port for gas at high pressure and having valve control means for continuously modulating valve closure means between a first position for closing off the first outlet port and a second position for closing off the second outlet port, a gas leak passage being provided through the valve closure means from the high pressure side to pressure operated biasing means on the low pressure side of the valve closure means so as to compensate for the force exerted on the valve closure means by the pressure differential between said high and low pressure sides thereof, the biasing means comprising a chamber in the form of a piston cylinder through which a piston rod of the valve closure means is disposed, a biasing piston fixed about said piston rod with a sliding fit in said piston cylinder substantially separating said chamber from the low pressure side of the valve closure means so that in use of the valve high pressure gas enters the chamber through the gas leak passage and exerts a force on the biasing piston counteracting the force exerted on the valve closure means due to the pressure differential between the high and low pressure sides thereof.

The valve control means is preferably of the continuously modulating electro-magnetic type though other known types with electric motor or diaphragm prime movers may also be used, and indeed direct manual operation is also possible.

The following is a description by way of example of three embodiments of the present invention, with reference to the accompanying drawings, in which.

DESCRIPTION OF THE PREFERRED EMBODIMENTS

Figure 1:
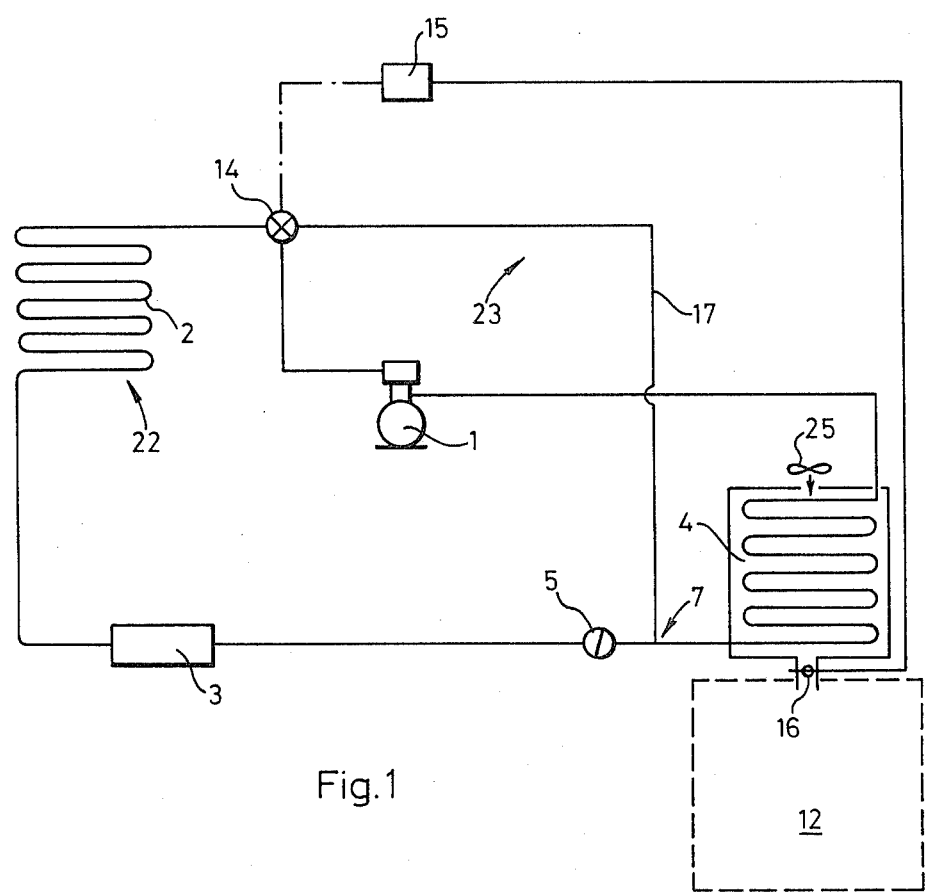
FIG. 1 is a schematic representation of a refrigerator system circuit.

Referring to the drawings, FIG. 1 shows a refrigeration system including a conventional refrigerator circuit 22 and a so-called hot gas by-pass circuit 23. The conventional or main circuit 22 includes a compressor 1, a condenser 2, a liquid receiver 3 and an evaporator 4. For normal cooling, the refrigerant passes from the compressor 1 to the condenser 2 where it is liquefied and then through the liquid receiver 3 to an expansion valve 5 (normally a thermostatic valve with a bulb and capillary) before entering the evaporator 4.

The by-pass circuit 23 leaves the main circuit at a T-junction controlled by a continuously modulating apportioning valve 14, includes a by-pass conduit 17, and rejoins the main circuit at point 7 near the inlet to the evaporator 4. The valve 14 is controlled by a controller 15 whose sensor is a thermometer bulb 16. The electrical connection between the thermostat and the valve is shown by a dash-dot line.

The bulb 16 is situated at a point where air is passed into a refrigerated space 12, having been cooled by its passage over the evaporator 4. A fan 25 is provided to force the air over the evaporator. It has been found that locating the bulb at this point allows the optimum control of the temperature of the gas throughout the space 12. Especially during the controlling phase of refrigeration, where the temperature is fluctuating around its set point this location of the bulb gives the closest control with minimal temperature variations. Nevertheless, other locations may also be used, for example, in the return air flow or in both the return air flow and the flow of air into the refrigerated space. Preferably the thermometer bulb has a short time constant of 5 seconds or less.

Figure 2:
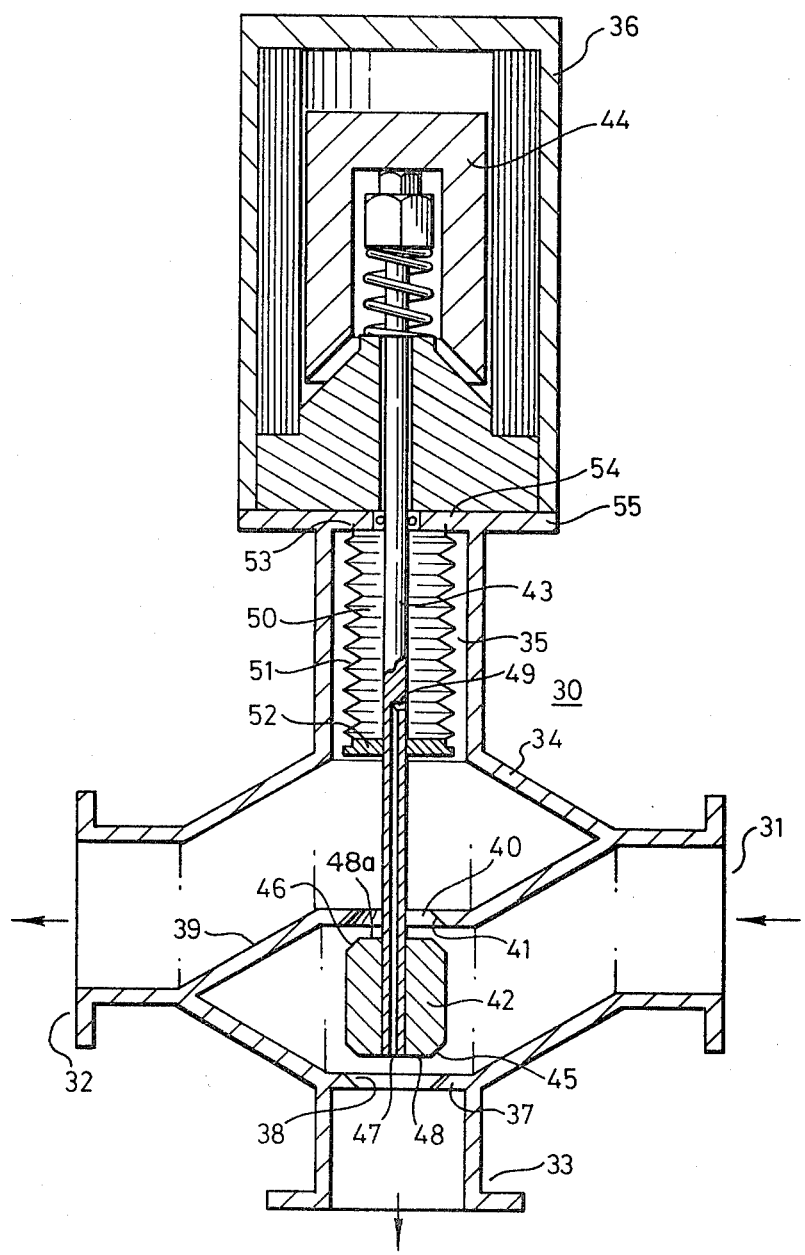
FIG. 2 is a cross-sectional elevation of a first apportioning valve for use in the circuit of FIG. 1.

In FIG. 2 is shown a first apportioning valve 30 having generally a cruciform body with one arm as a high pressure gas intake 31, connectable via suitable piping to the compressor 1; a second arm opposite the intake as a first, low pressure, gas outlet 32 connectable to the hot gas by-pass 23; a "head piece" as a second, high pressure, gas outlet 33 connectable by suitable piping to the condenser 2; and a "base portion" defining a cylindrical passage 35 connected at its outer end with a continuously modulating electromagnetic solenoid control means 36 known per se.

The inner end 37 of second outlet port 33 is provided with a first valve seating 38. A generally diagonal dividing wall 39 between on the one hand the intake 31 and second outlet 33 and on the other hand the first outlet 32 and cylindrical passage 35 is provided with a central aperture 40 having a second valve seating 41 facing first valve seating 38.

Valve closure means 42 is disposed between said valve seatings 38, 41 and is mounted at one end of a piston rod 43 extending through aperture 40 and said cylindrical passage 35 and having its other end provided with electromagnetically drivable means 44 which form part of said control means 36.

The valve closure means 42 is provided with first and second sealing means 45, 46 for co-operating respectively in end limit positions of movement of the valve closure means.

A gas leak passage 47 extends axially from the end face 48 of the valve closure means 42 along the piston rod 43 and terminates in a radial arm 49 which exits within cylindrical passage 35 into an expansible chamber 50. The end face 48 faces valve seating 38 and the opposite end face 48a faces valve seating 41.

The chamber 50 is defined by bellows 51 disposed concentrically around piston rod 43 and having one end 52 fixed to the valve closure means 42 and the other end 53 fixed to annular end wall means 54 fixed at the outer end 55 of cylindrical passage 35, between said end 55 and the control means 36.

In use of the valve 30, the valve closure means 42 is continuously modulatable between a first end limit position closing off second outlet 33, in which case gas from the compressor would be directed to the hot gas by-pass 23, and a second end limit position closing off the first outlet 32 in which case gas from the compressor would be directed to the condenser 2. In intermediate positions the compressed gas is continuously variably apportioned between the hot gas by-pass 23 and condenser 2.

The gas leak passage 47 allows gas from the high pressure side of the dividing wall means 39 to enter the chamber 50 defined by bellows 51 on the low pressure side and cause the bellows to tend to expand axially thereby exerting a force on the valve closure means 42 tending to oppose that exerted on the valve closure means 42 by the pressure differential between the two sides thereof. In this way, stress on the control means 36 is reduced by a balancing of forces.

However, under certain circumstances, e.g. very high pressure differentials, there may be a tendency for the bellows to expand radially and friction to arise between the cylinder passage 35 walls and the expanded bellows portion (not shown). The stresses may eventually result in rupture of the bellows and loss of balancing with deleterious consequences. These difficulties are substantially avoided in the following embodiments.

Figure 3:
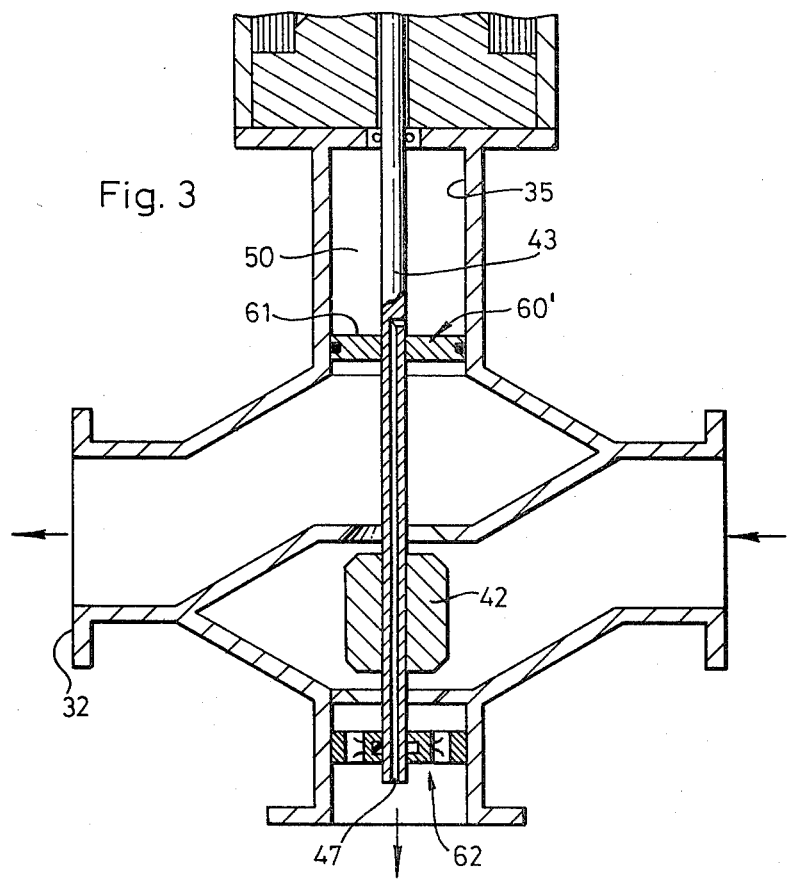
FIG. 3 is a partial cross-sectional elevation of a second apportioning valve suitable for use in the circuit of FIG. 1.

FIG. 3 shows a valve substantially similar to that of FIG. 2, like parts having like numbers, except that the bellows are replaced by a piston 60 fixed on the piston rod 43 so as to be slidable within the cylindrical passage 35 and defining an end face 61 of expansible chamber 50. The piston is provided with a low friction, e.g. PTFE Teflon, piston ring to minimize friction. The piston ring may be a conventional "split" piston ring, though advantageously a continuous piston ring is used as this minimizes gas leakage. In this case though the piston 60 would need to be made in two halves to facilitate assembly.

Also, the piston rod 43 is extended, with its axial passage 47 beyond the valve closure means 42 and through into the second outlet in which it is slidably axially supported by a locating spider 62 with ball bearings in hemispherical cups or with a PTFE O ring (as shown in FIG. 3) remote from the control means 36. This helps to achieve a more symmetrical distribution of forces and movement of the valve closure means, but may be dispensed with in the present embodiment.

Figure 4:
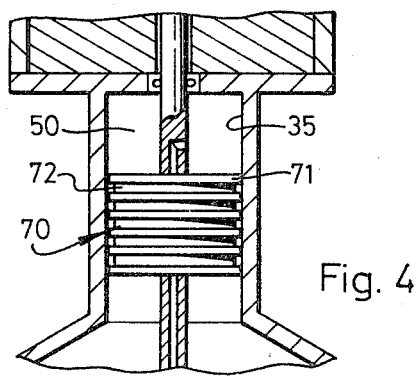
FIG. 4 is a detail modification of FIG. 3.

FIG. 4 shows an alternative to piston 60 of FIG. 3 in the form of a labyrinth piston 70 having rings 71 and troughs 72. In this case a continuous slight leakage of high pressure gas from the chamber 50 occurs through the rings and troughs 71, 72 and at the same time providing some gas flow to the hot gas by-pass 23 even when the valve closure means 42 is in its second end limit position closing first outlet 32 to the by-pass 23. In the case of this embodiment, in contrast to that of FIG. 3, it is considered that a locating spider 62 should be used to ensure correct operation.

It will be appreciated by those skilled in the art that various modifications of the above described embodiments can readily be made without departing from the scope of the present invention. Thus, the relative disposition of the intake 31, and first and second outlets 32, 33 may be changed so that the valve no longer has a cruciform shape but the first and second outlets are both disposed one above the other on the opposite side of the valve body from that on which the intake is located. Also the valve closure means 42 could be formed in two separate parts each carrying one of the first and second sealing means 45, 46, and both mounted on the piston rod 43 through which the gas leak passage 47 extends so that the parts move together.

The embodiments of the invention in which an exclusive property or privilege is claimed are defined as follows:

1. In a refrigeration system for a substantially enclosed space and including a compressor, a condenser and an evaporator, conduit means connecting said compressor, condenser and evaporator to form a cooling circuit, a hot gas by-pass conduit having a first junction with said cooling circuit between the compressor and the condenser, and a second junction with said cooling circuit between the condenser and the evaporator, and means provided in the system for apportioning flow of compressed refrigerant gas from the compressor between the condenser and the by-pass conduit so that during a temperature controlling phase of refrigeration, the gas flows through both the condenser and the by-pass conduit, the apportioning means being arranged to control the relative proportions of the gas flowing through the condenser and the by-pass conduit to provide either net heating or net cooling of the enclosed space, the improvement which comprises, said system including a fan to force air over the evaporator, a single temperature measuring device located at a point where the air has been cooled by being passed over the evaporator, means operable by said temperature measuring device to control operation of the apportioning means, said apportioning means being in the form of a continuously modulating valve located at said first junction of the hot gas by-pass conduit with the cooling circuit, said valve having a hot gas intake port for receiving hot gas from the compressor, a first outlet port connected to the hot gas by-pass conduit, a second outlet port connected to the cooling circuit upstream of the condenser, valve closure means, and valve control means for continuously modulating said valve closure means between a first position for closing off the first outlet port and a second position for closing off the second outlet port, whereby the hot gas may be continuously variably apportioned between said hot gas by-pass conduit and the condenser.

2. The system of claim 1 in which the valve is a balanced pressure type valve.

3. The system of claim 2 in which the valve closure means has a first end face in communication with said second outlet port and a second end face in communication with said first outlet port, a gas leak passage through said valve closure means, and pressure operated biasing means lying beyond the said second end face of the valve closure means, said gas leak passage leading from the first end face of the valve closure means to said pressure operated biasing means and said biasing means being arranged so as to compensate for a force exerted on said valve closure means, in use of the system, by a pressure differential between said first and second end faces of said valve closure means.

4. The system of claim 3 in which the biasing means comprises axially expansible bellows, said bellows having one end fixed and the other end attached to the movable valve closure means.

5. The system of claim 3 in which the biasing means comprises a chamber in the form of a piston cylinder, the piston rod of the valve closure means disposed through said piston cylinder, a biasing piston fixed about said piston rod with a sliding fit in said piston cylinder substantially separating said chamber from said second end face of the valve closure means so that in use of the valve high pressure gas enters the chamber through the gas leak passage and exerts a force on the biasing piston counteracting the force exerted on the valve closure means due to the pressure differential between the first and second end faces of said valve closure means.

6. The system of claim 5 in which the biasing piston is provided with a piston ring of PTFE.

7. The system of claim 6 in which the piston ring is of the continuous type.

8. The system according to claim 5 in which the biasing piston is a labyrinth piston.

9. The system according to claim 1 in which the valve control means is of the continuously modulating electro-magnetic type.

* * * * *